(12) United States Patent
Allen et al.

(10) Patent No.: US 11,145,333 B2
(45) Date of Patent: Oct. 12, 2021

(54) TOOL CAPTURE AND PRESENTATION SYSTEM

(71) Applicant: ADOBE INC., San Jose, CA (US)

(72) Inventors: William Hayes Allen, Menlo Park, CA (US); Lubomira Dontcheva, Seattle, WA (US); Haiqing Lu, Brooklyn, NY (US); Zachary Platt McCullough, Jersey City, NJ (US); David R. Stein, Brooklyn, NY (US); Christopher Nuuja, San Anselmo, CA (US); Benoit Ambry, San Jose, CA (US); Joel Richard Brandt, Venice, CA (US); Cristin Ailidh Fraser, San Diego, CA (US); Joy Oakyung Kim, Menlo Park, CA (US); Hijung Shin, Arlington, MA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/679,013

(22) Filed: Nov. 8, 2019

(65) Prior Publication Data
US 2021/0142827 A1    May 13, 2021

(51) Int. Cl.
*G11B 27/034* (2006.01)
*G11B 27/036* (2006.01)
*G06F 3/0484* (2013.01)

(52) U.S. Cl.
CPC ........ *G11B 27/034* (2013.01); *G06F 3/04842* (2013.01); *G06F 3/04845* (2013.01); *G11B 27/036* (2013.01)

(58) Field of Classification Search
CPC . G11B 27/034; G11B 27/036; G06F 3/04842; G06F 3/0482; G06F 3/04845
See application file for complete search history.

(56) References Cited

U.S. PATENT DOCUMENTS

2015/0139610 A1* 5/2015 Syed ............... G11B 27/11
                                                   386/241
2020/0334290 A1  10/2020 Dontcheva et al.

OTHER PUBLICATIONS

Banovic, N., Grossman, T., Matejka, J., & Fitzmaurice, G. (Oct. 2012). Waken: reverse engineering usage information and interface structure from software videos. In Proceedings of the 25th annual ACM symposium on User interface software and technology (pp. 83-92).

(Continued)

*Primary Examiner* — Thai Q Tran
*Assistant Examiner* — Jose M Mesa
(74) *Attorney, Agent, or Firm* — Shook, Hardy & Bacon L.L.P.

(57) ABSTRACT

Systems and methods provide for capturing and presenting content creation tools of an application used in a video. Application data from the application for the duration of the video is received. The application data includes data identifiers and time markers corresponding to user interaction with an application in a video. The application data is processed to detect tool identifiers identifying tools used in the video based on the data identifiers. For each a tool identifier, a tool label and a corresponding time in the timeline is determined. A tool record storing the tool labels and the corresponding times in association with the video is generated. When a viewer requests to watch the video, the tool record is presented to the viewer in conjunction with the video.

20 Claims, 9 Drawing Sheets

(56) References Cited

OTHER PUBLICATIONS

Beaudouin-Lafon, M., & Mackay, W. E. (Apr. 2018). Rethinking Interaction: From Instrumental Interaction to Human-Computer Partnerships. In Extended Abstracts of the 2018 CHI Conference on Human Factors in Computing Systems (pp. 1-5).
[Brandt, J., Dontcheva, M., Weskamp, M., & Klemmer, S. R. (Apr. 2010). Example-centric programming: integrating web search into the development environment. In Proceedings of the SIGCHI Conference on Human Factors in Computing Systems (pp. 513-522).
Chang, T. H., Yeh, T., & Miller, R. (Oct. 2011). Associating the visual representation of user interfaces with their internal structures and metadata. In Proceedings of the 24th annual ACM symposium on User interface software and technology (pp. 245-256).
Chi, P. Y., Ahn, S., Ren, A., Dontcheva, M., Li, W., & Hartmann, B. (Oct. 2012). MixT: automatic generation of step-by-step mixed media tutorials. In Proceedings of the 25th annual ACM symposium on User interface software and technology (pp. 93-102).
Chilana, P. K., Ko, A. J., & Wobbrock, J. O. (May 2012). LemonAid: selection-based crowdsourced contextual help for web applications. In Proceedings of the SIGCHI Conference on Human Factors in Computing Systems (pp. 1549-1558).
Dixon, M., Nied, A., & Fogarty, J. (Oct. 2014). Prefab layers and prefab annotations: extensible pixel-based interpretation of graphical interfaces. In Proceedings of the 27th annual ACM symposium on User interface software and technology (pp. 221-230).
Ekstrand, M., Li, W., Grossman, T., Matejka, J., & Fitzmaurice, G. (Oct. 2011). Searching for software learning resources using application context. In Proceedings of the 24th annual ACM symposium on User interface software and technology (pp. 195-204).
Fourney, A., Lafreniere, B., Chilana, P., & Terry, M. (Oct. 2014). InterTwine: creating interapplication information scent to support coordinated use of software. In Proceedings of the 27th annual ACM symposium on User interface software and technology (pp. 429-438).
Fraser, C. A., Dontcheva, M., Winnemöller, H., Ehrlich, S., & Klemmer, S. (Jun. 2016). DiscoverySpace: Suggesting Actions in Complex Software. In Proceedings of the 2016 ACM Conference on Designing Interactive Systems (pp. 1221-1232).
Girgensohn, A., Adcock, J., Cooper, M., & Wilcox, L. (Sep. 2005). A synergistic approach to efficient interactive video retrieval. In IFIP Conference on Human-Computer Interaction (pp. 781-794). Springer, Berlin, Heidelberg.
Glassman, E. L., & Russell, D. M. (2016). DocMatrix: Self-teaching from multiple sources. Proceedings of the Association for Information Science and Technology, 53(1), 1-10.
Grossman, T., & Fitzmaurice, G. (Apr. 2010). ToolClips: an investigation of contextual video assistance for functionality understanding. In Proceedings of the SIGCHI Conference on Human Factors in Computing Systems (pp. 1515-1524).
Grossman, T., Matejka, J., & Fitzmaurice, G. (Oct. 2010). Chronicle: capture, exploration, and playback of document workflow histories. In Proceedings of the 23nd annual ACM symposium on User interface software and technology (pp. 143-152).
Hearst, M. (2009). Chapter 5: Presentation of Search Results. Search User Interfaces. Cambridge University Press, Cambridge, 120-139.
Ichinco, M., Hnin, W. Y., & Kelleher, C. L. (May 2017). Suggesting api usage to novice programmers with the example guru. In Proceedings of the 2017 CHI Conference on Human Factors in Computing Systems (pp. 1105-1117).
Kim, J., Guo, P. J., Cai, C. J., Li, S. W., Gajos, K. Z., & Miller, R. C. (Oct. 2014). Data-driven interaction techniques for improving navigation of educational videos. In Proceedings of the 27th annual ACM symposium on User interface software and technology (pp. 563-572).
Kim, J., Nguyen, P. T., Weir, S., Guo, P. J., Miller, R. C., & Gajos, K. Z. (Apr. 2014). Crowdsourcing step-by-step information extraction to enhance existing how-to videos. In Proceedings of the SIGCHI Conference on Human Factors in Computing Systems (pp. 4017-4026).
Lafreniere, B., Bunt, A., & Terry, M. (Dec. 2014). Task-centric interfaces for feature-rich software. In Proceedings of the 26th Australian Computer-Human Interaction Conference on Designing Futures: the Future of Design (pp. 49-58).
Lafreniere, B., Grossman, T., Matejka, J., & Fitzmaurice, G. (Apr. 2014). Investigating the feasibility of extracting tool demonstrations from in-situ video content. In Proceedings of the SIGCHI Conference on Human Factors in Computing Systems (pp. 4007-4016).
Matejka, J., Grossman, T., & Fitzmaurice, G. (May 2011). Ambient help. In Proceedings of the SIGCHI Conference on Human Factors in Computing Systems (pp. 2751-2760).
Matejka, J., Grossman, T., & Fitzmaurice, G. (Oct. 2011). IP-QAT: in-product questions, answers, & tips. In Proceedings of the 24th annual ACM symposium on User interface software and technology (pp. 175-184).
Matejka, J., Grossman, T., & Fitzmaurice, G. (Apr. 2013). Patina: Dynamic heatmaps for visualizing application usage. In Proceedings of the SIGCHI Conference on Human Factors in Computing Systems (pp. 3227-3236).
Matejka, J., Li, W., Grossman, T., & Fitzmaurice, G. (Oct. 2009). CommunityCommands: command recommendations for software applications. In Proceedings of the 22nd annual ACM symposium on User interface software and technology (pp. 193-202).
Nguyen, C., & Liu, F. (Apr. 2015). Making software tutorial video responsive. In Proceedings of the 33rd Annual ACM Conference on Human Factors in Computing Systems (pp. 1565-1568).
Norman, D. A. (2005). Human-centered design considered harmful. interactions, 12(4), 14-19.
Pavel, A., Berthouzoz, F., Hartmann, B., & Agrawala, M. (2013). Browsing and analyzing the command-level structure of large collections of image manipulation tutorials. Citeseer, Tech. Rep.
Pavel, A., Goldman, D. B., Hartmann, B., & Agrawala, M. (Nov. 2015). Sceneskim: Searching and browsing movies using synchronized captions, scripts and plot summaries. In Proceedings of the 28th Annual ACM Symposium on User Interface Software & Technology (pp. 181-190).
Pavel, A., Reed, C., Hartmann, B., & Agrawala, M. (Oct. 2014). Video digests: a browsable, skimmable format for informational lecture videos. In UIST (vol. 10, pp. 2642918-2647400).
Pongnumkul, S., Dontcheva, M., Li, W., Wang, J., Bourdev, L., Avidan, S., & Cohen, M. F. (Oct. 2011). Pause-and-play: automatically linking screencast video tutorials with applications. In Proceedings of the 24th annual ACM symposium on User interface software and technology (pp. 135-144).
Nguyen, M., Schoop, E., Karchemsky, M., Savage, V., Hartmann, B., & Follmer, S. (2016). Drill Sergeant: Supporting Physical Construction Projects through an Ecosystem of Augmented Tools.
Stuerzlinger, W., Chapuis, O., Phillips, D., & Roussel, N. (Oct. 2006). User interface façades: towards fully adaptable user interfaces. In Proceedings of the 19th annual ACM symposium on User interface software and technology (pp. 309-318).
Sullivan, D. (2018). A reintroduction to Google's featured snippets. Retrieved Mar. 28, 2018. Retrieved from the Internet on Oct. 29, 2020 <https://www.blog.google/products/search/reintroduction-googles-featured-snippets/>.
Tuovinen, J. E., & Sweller, J. (1999). A comparison of cognitive load associated with discovery learning and worked examples. Journal of educational psychology, 91(2), 334.
Vermette, L., Dembla, S., Wang, A. Y., McGrenere, J., & Chilana, P. K. (2017). Social CheatSheet: An Interactive Community-Curated Information Overlay for Web Applications. Proceedings of the ACM on Human-Computer Interaction, 1(CSCW), 1-19.
Wang, X., Lafreniere, B., & Grossman, T. (Apr. 2018). Leveraging community-generated videos and command logs to classify and recommend software workflows. In Proceedings of the 2018 CHI Conference on Human Factors in Computing Systems (pp. 1-13).

(56) References Cited

OTHER PUBLICATIONS

Zhong, Y., Raman, T. V., Burkhardt, C., Biadsy, F., & Bigham, J. P. (Apr. 2014). JustSpeak: enabling universal voice control on Android. In Proceedings of the 11th Web for All Conference (pp. 1-4).

* cited by examiner

TOOL CAPTURE AND PRESENTATION SYSTEM

BACKGROUND

Conventional content creation applications (e.g., web-based applications, software platforms) include one or more content creation tools that provide a user with the ability to create artistic content or any other content (e.g., programming using programming tools) within the application. Video-sharing applications and platforms are often used by artists to generate videos (e.g., livestreams) of their creative process in content creation applications. Further, video instructions are increasingly being used as educational tools to teach and learn how to create content on various content creation applications. Usually, the viewers of these videos rely solely on the quality of the presentation to understand the creative process of the artists. However, while these video instructions are often helpful for a user to visualize the use of the creative tools available on a content creation application, the videos can be too lengthy, unstructured and/or hard to follow. Specifically, it can be hard to follow exactly what tools (e.g., color, text, size, stroke, shape, fill, path) and what settings (e.g., brush stroke, shade) of the tools are being used by artists to perform various functions. Artists can perform actions too quickly for viewers to efficiently follow. In certain instances, a viewer may have to jump back and forth through the video to determine the exact tools being used in order to replicate a function performed by the artist effectively. Essentially, the conventional content creation applications and video-sharing applications/platforms lack the ability to capture and display creative content tools being used to perform functions or tasks in a content creation application shown in a video, making it difficult for users to understand how the content is being created.

SUMMARY

Embodiments of the present disclosure relate to capturing and presenting content creation tools and their corresponding settings of a content creation application used in a video. Systems and methods are disclosed that expose content creation tools and their corresponding settings from a content creation application used by an artist in a video along with a time within the video when each tool is used. Application data from a content creation application used to generate the creative content is captured and processed to expose specific content creation tools and settings for the tools (e.g., brush size, stroke) used by the artist at particular times during the video. This data is displayed to a user via a graphical user interface in conjunction with the video, when viewed live or on replay, to help the user navigate the video and efficiently learn the creative process of the artist.

In some configurations, an add-on or a plugin may be used to capture the application data directly from a content creation application as the artist generates content while recording the video. The plugin provides the application data to a tool capturing system that processes the application data to detect content generation tools and their corresponding times in the timeline of the video based on tool identifiers detected in the application data. In other configurations, a content creation application itself may include a built-in ability to capture the application data to ultimately detect tools within the content creation application used by an artist in a video. In still further configurations, an operating system's accessibility application programming interface (API) may be used to determine tools of the content creation application being used in a video. The operating system's API may receive application data from the content creation application and send tool information (e.g., tool identifiers) to the tool capturing system to ultimately determine tool labels. The tool capturing system may determine tool labels for each tool identifier in the application data, associate it with the time markers in the video's timeline. The tool labels may be presented to viewers when viewing the video. In some examples, corresponding time markers for the tool labels may also be presented.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present systems and methods for capturing content creation tools while livestreaming is described in detail below with reference to the attached drawing figures, wherein.

DETAILED DESCRIPTION

Figure 1:
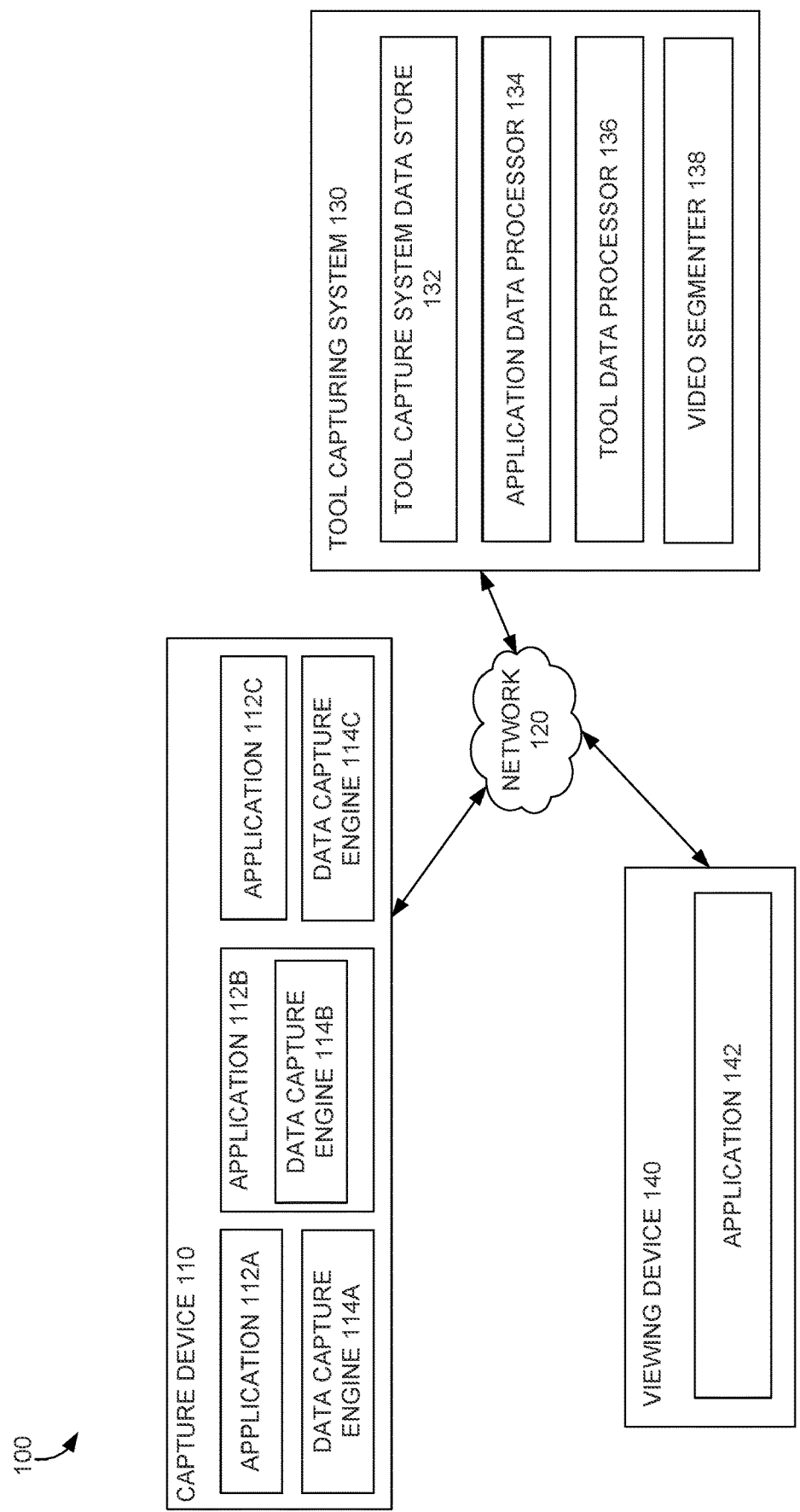
FIG. 1 is a block diagram of an exemplary environment suitable for use in implementing embodiments of the invention, in accordance with embodiments of the present invention.

Systems and methods are disclosed related to capturing and presenting content creation tools of an application used in videos, live and in replay. Content creation applications (e.g., PHOTOSHOP®, Fresco®) conventionally allow users (e.g., artists) to generate videos to document their creative process and generate creative content. The videos can be watched in real-time or on replay on one or more video-sharing applications (e.g., YOUTUBE®, TWITCH®, SKILLSHARE®, CREATIVELIVE®, LYNDA®) or via a web browser. For example, a user can use a web-browser to search for and watch a live or replay of a video to learn how to create creative content on PHOTOSHOP®. Videos (e.g., livestreams) are an increasingly popular form of instructional materials for creative content generation on applications.

Generally, the conventional content creation applications and live-streaming applications/platforms lack the ability to capture and expose the tools being used by users (e.g., artists) in videos. The videos allow users to watch the creative process but without context to the exact tools and their settings being used for each task performed. While the creator (e.g., artist) may verbally describe the tool being used, it is often hard for users to follow exactly what tools, their locations, and their settings are being used. Further, the creator can move through the tools quickly, and a user may have to go back and forth through the video to effectively understand the creative process being demonstrated. In this way, the videos can be hard to follow and navigate, both, live and in replay.

Embodiments of the present disclosure address the technical problem of providing insufficient information regarding specific tools (e.g., color, text, size, stroke, shape, fill, path) and their settings (e.g., configurations, characteristics) to viewers of videos by extracting application data from a content creation application to capture and display tools being used in real-time during a video, while the video is played live and/or in replay. Embodiments of the present invention relate to methods, systems, and computer storage media for capturing and presenting content creation tools used in a video (e.g., livestream) based on the application data (e.g., data stream) generated by the content creation application when recording the video. In particular, for a given video, application data generated by the content creation application on which the content is being created can be leveraged to determine what tools are being used by an artist at any given time of the timeline of the video and the tool settings. The application data includes data identifiers that identify each user interaction within the content creation application during the video. The application data also includes time markers (e.g., time stamps) with each time marker indicating a time in the video when a particular data identifier was detected. The data identifiers are compared against a list of tool identifiers that each indicate a content creation tool and/or its settings (e.g., size, brush stroke) within a given application. For each tool identifier detected to be present in the video, its corresponding tool label (e.g., tool name, tool setting) is determined. The tool labels are then associated with the time in the timeline of the video where the corresponding tool identifier was detected. A tool record including the tool label associated with their corresponding times may be generated and stored in association with the video or presented via a video-sharing application when viewed live. Further, whenever a user chooses to watch the video, live or in replay, the tools labels may be presented to the user in conjunction with the video. In some examples, the corresponding times for the tool labels may also be presented. More tool labels may be added and presented as new tools are detected to be used in the video in real-time, as the video is watched live.

The tool record can also be associated with the timeline of the video, such that when a user interacts with a tool label in the tool record presented alongside the video, the video jumps to the time in the timeline where the tool associated with that particular tool label is used. In examples where the corresponding time associated with the tool label is also presented, the corresponding time may be associated with the timeline of the video, such that when a user interacts with the time, the video jumps to that time in the timeline where the tool associated with the corresponding tool label is used. Further, a transcript of the video may also be generated and segmented based on the tools detected in the video. The tool names (e.g., labels) in the transcript may also be associated with the timeline of the video such that when a user selects the tool name or the time associated with that segment of the transcript, the video automatically jumps to the time when the tool is used.

In some examples, the transcript of the video and the tool record may be leveraged to determine a temporal segmentation of the video. The transcript may include explanation of major steps or techniques used by the creator of the video or livestream. In this regard, the transcript may be segmented into individual sentences and each sentence may be associated with a start and end time of the corresponding sentence within the timeline of the video. The tools in the tool record may be categorized into various categories (e.g. navigational tools, editing tools, backtracking tools, etc.) based on each tool's functionality. For example, tools that do not alter the creative content (e.g., zoom, hide layer) in the video itself can be categorized as navigational tools, the tools that do alter the creative content (e.g., brush, create layer) can be categorized as editing tools, and tools that include undoing or deleting past actions, may be categorized as backtracking tools. In some examples, the tool record may further be categorized into various fine-grained categories (e.g., painting tools, typography tools, styling tools, etc.). The tool categories may be determined based on the underlying application on which the content is being created. Initially, all possible candidate boundaries (i.e., start times, end times) indicating time segments for temporal segments within the timeline may be identified based on a union of all tools in the tool label and their associated times with the beginning and end time of each sentence of the segmented transcript. Any tool in the tool record with an associated time in the middle of a sentence beginning and end time may be disregarded for determining candidate boundaries for temporal segments. A candidate temporal segment, $p_i$, may be an interval between two consecutive candidate boundaries, $t_i$ and $t_{i+1}$, represented as $p_i=[t_i,t_{i+1})$. In some examples, a beginning part of the video is not considered for a candidate temporal segment, when the transcript does not include a tool name, and the tool record does not include a tool label for the beginning of the video.

The candidate temporal segments may then be used to determine an optimal set of boundaries to segment the video into optimal temporal segments. In some examples, for each interval, $p_i$, an optimal set of segments, $S_i$, may be determined based on all pervious intervals, including the interval in question. A total score, $E(S_i)$, may further be determined for each interval. The intervals may be considered in order as they arrive in the video. In some examples, an optimal set of boundaries to segment the video for each interval, $p_i=[t_i, t_{i+1})$, may be determined by considering each previous candidate boundary, $t_j$, where $j \leq i$. In some examples, it may be determined whether a segment that includes intervals (e.g., candidate segments) $P_{ji}=\{p_j, \ldots, p_i\}$ should be included as a temporal segment or added to a previous (i.e., last) segment in $S_{j-1}$. The two possibilities for each interval may be considered for all previous candidate boundaries, $t_j$. A score for each candidate segment may then be determined. In some examples, a total score for each candidate set of segments may be determined based on scores for individual segments in the set. A total score for a candidate set of segments, $S_i$, may be determined as follows:

$$E(S_i) = \frac{1}{|S_i|} \sum_{s \in S} e(s)$$

where $|S_i|$ is the number of segments in the candidate set of segments, $S_i$, and each s is a set of contiguous intervals $\{p_k, \ldots, p_{k+m}\}$. The candidate set of segments with the highest score may be determined to be the optimal temporal segmentation with the optimal temporal segments for the input video. In some examples, the score, e(s), for each segment, s, may be determined based on one or more of a duration of the segment, transitional tools in the tool record that fall within that segment, coherence of the application tools in the segment, and transitional phrases in the transcript belonging to that segment. The candidate temporal segmentation with the highest score may then be used as the temporal segmentation for the video.

The application data is accessed and communicated to determine the tool labels using several different techniques. In some configurations, an add-on to the content creation application operates as a data capture engine configured to capture the application data. In other configurations, the content creation application itself includes a built-in data capture engine to capture the application data. In yet further configurations, a device's operating system API may be leveraged as a data capture engine to capture the application data. In this way, different tool capturing approaches are available and may be selected for a content creation application based on its coding. For example, an add-on data capture engine may be used when the content creation application has a complicated code; a new content creation application may include a built-in data capture engine; and an operating system may be leveraged to capture application data when the operating system of the device is exposed to a developer.

As such, the tools and tool settings of a content creation application used in a video can be presented to a viewer live or in replay to allow a user to efficiently and effectively navigate and understand the creative process featured in the video. For example, a viewer can be presented with a particular tool and/or its setting while the video is being watched in real-time as the video is being created via a content creation application such that the user can see the exact tool and/or its settings when it is used in a content creation application in real-time. In another example, a viewer can be presented with the exact time (e.g., as associated with the presented tool label) when a particular tool is used to perform a function such that the user can easily find the location within the timeline for where to look for it based on the time associated with the tool label in the tool record.

In some embodiments, the users may also be presented with a segmented transcript of the video. The transcript may be generated using a natural language algorithm that can take as input the audio of the video and output a natural language transcript. The transcript may be segmented using a known segmentation algorithm based on the tools being used by the artist. In some examples, the tool record may be used to determine the positions in the transcript to segment the transcript. In another example, a word search for the tool labels (e.g., tool names) may be used to segment the transcript. In yet another example, the transcript may be segmented based on pauses in the audio. Any combination of the above may be used to segment the transcript. The segmented transcript may include a start time for when in the video the segment begins. The segmented transcript and the start time for each segment may be presented to viewers of the video. The start times and/or tool labels, if included in the segment, may be selectable such that selection of either may jump the video to the start time in the timeline.

In some other examples, the users may be presented with a temporal segmentation of the video. The temporal segmentation may segment the video into optimal temporal segments that meaningfully divide the video into various sections. The temporal segmentation may be determined based on the tools tables, video transcript and/or chat. The temporal segmentation may be presented as a temporal segmentation or sections table including segments of the video shown as sections along with corresponding time segments representing start and end times of each of the temporal segments. The timeline of the video may also be presented as segmented into sections based on the time segments. The temporal segments may be represented in the timeline using markers within the timeline, and the segments may be sections between two consecutive markers. The temporal segments and/or the time segments may also be associated with the timeline such that a selection of segment (e.g. section) or a time segment in the table may jump the video to the associated start time of the corresponding time segment in the timeline.

Aspects of the technology disclosed herein provide a number of advantages over previous solutions. For instance, one previous approach involves generating a basic transcript of the video. While the transcript can be useful for certain aspects of understanding the content being created in a video, the transcript by itself does not allow a viewer to determine where in the application a tool is located and when within the timeline of the video the tool is being used. Further, a general transcript does not allow a viewer to determine a specific time period when a major action is performed. Particularly, the previous solutions require a viewer to either pay close attention to the content being created at all times or navigate back and forth within the video to truly understand how, when, where and how a tool of interest is being used. Further, previous solutions depend on live chat between users (e.g., artist, viewers) to direct a viewer's attention to the video when events of interest occur. However, by the time a viewer realizes that an event of interest has occurred, the viewer may be required to go back in the timeline to access the information. To avoid such shortcomings of the previous solutions, implementations of the technology described herein, for instance, leverages application data from the content creation application during the video to detect and present content creation tools and/or sections (e.g., segments) of interest to users in a user-friendly, efficient manner in real-time such that a tool is presented as it is being used in the video. The implementations of the present technology also allow users to interact with a video to efficiently and effectively navigate and understand the creative process of an artist creating content in a video.

With reference now to FIG. 1, a block diagram is providing shown an exemplary system 100 for using application data to capture content creation tools of a content creation application, e.g., application 112A, 112B or 112C, used in a video, using a tool capturing system 130, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The tool capturing and presentation system 100 is an example of a suitable architecture for implementing certain aspects of the present disclosure. Among other components not shown, the system 100 includes a capture device 110 interacting with a tool capturing system 130 that is configured to detect and cause presentation, via a viewing device 140 of creative tools used in a video (e.g., livestream) created via an application of the capture device 110. Each of the components shown in FIG. 1 can be provided on one or more computing devices, such as the computing device 900 of FIG. 9, discussed below. As shown in FIG. 1, the capture device 110, the tool capturing system 130, and the viewing device 140 can communicate via a network 120, which may include, without limitation, one or more local area networks (LANs) and/or wide area networks (WANs). Such networking environments are commonplace in offices, enterprise-wide computer networks, intranets, and the Internet. It should be understood that any number of client (e.g., user) devices and tool capturing systems may be employed within the system 100 within the scope of the present invention. Each may comprise a single device or multiple devices cooperating in a distributed environment. For instance, the tool capturing system 130 could be provided by multiple server devices collectively providing the functionality of the tool capturing system 130 as described herein. Additionally, other components not shown may also be included within the network environment.

The tool capturing system 130 is generally configured to provide information about creative tools used in a video to user devices, such as the capture device 110 and viewing device 140. This could be information about creative tools within the context of a variety of different types of applications and platforms. The capture device 110 can access and communicate with the tool capturing system 130 via a web browser, other application or data capture engines, on the capture device 110 via the network 120. Alternatively, in other embodiments, the tool capturing system 130 or portions thereof can be provided locally on the capture device 110. The tool capturing system 130 provided locally and/or its functionality may be built-in into an application, such as application 112B. The tool capturing system 130 or portions thereof may be provided in a live streaming application programming interface of a particular application that allows a user of content creation application(s) to generate and share live streams while creating content on the content creation application(s).

The capture device 110 is generally configured to obtain application data corresponding a video (e.g., livestream) of content created in an application of the capture device 110. The video may be any video including creation of content on an application or webpage, live or finished. The capture device 110 may include an application 112A, a data capture engine 114A, an application 112B, a data capture engine 114B, an application 112C, and a data capture engine 114C that can be used to capture and/or communicate application data generated during creation of the video. At a high level, the capture device 110 is configured to receive a video generated via an application of the capture device 110 and capture application data using a data capture engine associated with the application. The application may generate application data based on a user's interaction (e.g., clicks, selections) with the application during the video. The application data may be a data stream of user interactions of a user of the capture device 110 within a particular application. The application data may include data identifiers for each user interaction within the application for the duration of the video. Further, the application data may include time markers within a timeline of the video for each data identifier. The time markers may indicate a time within the timeline of the video where the interaction occurred. The timeline of the video may be from a start of the video to an end of the video. For a live video, the timeline may be iteratively adjusted as the live video progress.

The capture device 110 may include the application 112A, the application 112B, and/or the application 112C, any of which may be used to generate creative content using tools specific to the application. The application 112A-112C may be content creation applications. For example, application 112A may include a first set of tools, application 112B may include a second set of tools, and application 112C may include a third set of tools. In one example, a video generating platform or application may be used to generate a video (e.g., livestream) of a user creating content on application 112A, application 112B and/or application 112C. In another example, application 112A, application 112B and/or application 112C may include a built-in ability to create a video of a user creating content in the respective application. A live streaming API may be used to generate and/or stream the video using the application data. The application data may include data identifiers for each user interaction within an associated content creation application (e.g., application 112A-112C) for the duration of the video. Further, the application data may include time markers within a timeline of the video for each data identifier. The time markers may indicate a time within the timeline of the video where the interaction occurred. The timeline of the video may be from a start of the video to an end of the video. For a live video, the timeline may be iteratively adjusted as the live video progress.

The data capture engine 114A may be configured to capture application data from application 112A when a video is created when creating content in application 112A. The application data may be a data stream of user interactions of a user of the capture device 110 within the application 112A. In one example, the data capture engine 114A may be an add-on that may be added in conjunction to the application 112A. In some examples, the data capture engine 114A may be a tool capture plug-in that may capture the application data internally from the application 112A while or after a video is created of a creative process in the application 112A. The data capture engine 114A may also be configured to send the application data to the tool capturing system 130. In this way, an application developer may efficiently generate or use an existing add-on plugin to capture application data from a complicated application without the need to re-code the application.

The data capture engine 114B may be configured to capture application data from application 112B when a video is created while creating content in application 112B. In a non-limiting example, the data capture engine 114B may be built-in the application 112B. The data capture engine 114B may be configured to capture application data any time a video is generated or added of content created in the application 112B. The data capture engine 114B may send the captured application data to the tool capturing system 130 via the network 120. In this way, an application developer creating a new content creation application or a developer with access and knowledge of the coding of an application can build-in an ability for application data capture in the respective application. In some examples, the tool capturing system 130, portions or functionality thereof, described in more detail below, may also be built-in the application 112B.

The data capture engine 114C may be configured to capture application data from the application 112C for the duration of the video, when the video is created of content being created in the application 112C. The data capture engine 114C may be another application designed to leverage an operating system's application programming interface (API) to capture the application data from the application 112C. The data capture engine 114C may then push the application data to the tool capturing system 130 for further processing. In this way, the data capture engine 114C may allow an application developer with access to an accessibility layer of the application 112C in question to develop a companion application to capture application data.

The data capture engines 114A, 114B, and 114C may communicate the application data to the tool capturing system 130 iteratively for a live video or at once at the end of the video for a replay. The application data of a live video may start being communicated when a user (e.g., artist) first begins recording or streaming the video. In another example, the application data of a video may be communicated at any time once the video has been created.

At a high level, the tool capturing system 130 includes takes as input the application data from a content creation application (e.g., application 112A-112C) of the capture device 110 associated with a video (e.g., livestream) to detect use of creative tools and/or their settings within the video timeline and to provide this information to a viewing device 140 when the video is being watched, either live or on replay. For each tool detected, the tool capturing system 130 provides a tool label and a time within the video timeline to the viewing device 140 based on the start and end time of the video timeline. For a live video, the end time for the video timeline may iteratively change as the live video is recorded. The tools and their corresponding settings may be detected by analyzing the application data for data identifiers that match tool identifiers stored in a tool capture system data store 132. The tool identifiers in the tool capture system data store 132 may be associated with tool labels for each tool and/or their settings of the content creation application on which the content was created. While only a single capture device 110 and viewing device 140 are shown in FIG. 1, it should be understood that the tool capturing system 130 may interact with and provide tool capturing services for any number of capture and viewing devices.

The tool capturing system 130 includes a tool capture system data store 132, an application data processor 134, a tool data processor 136, and a video segmenter 138. The tool capture system data store 132 may be configured to store the application data, tool capture data, and tool capture system data. The tool capture system data store 132 may be configured to obtain the application data from capture device 110. The tool capture system data store 132 may also include tool capture system data which may include tool data identifiers for all tool and/or their settings associated with tool labels for each content creation application. A tool data identifier may indicate every tool and/or its setting possible in the associated content creation application. The tool data identifier may be a data identifier for the tool and/or its setting, which matches a data identifier as it would appear in application data captured from that application. The data capture system data store 132 may include tool data identifiers for each tool and its setting available for use in a content creation application. The tool label may be a tool name for the associated tool or tool setting of the application.

The tool capture data in the tool capture system data store 132 may include a tool record for each instance of application data obtained from an application of the capture device 110 associated with a video. The tool capture system data store may associate the tool data structure with its respective video in the tool capture system data store 132. The tool capture system data store 132 may be configured to present the tool record to the viewing device 140 when the viewing device 140 requests to watch the video, live or on replay, associated with the tool record. The tool record is described in more detail with regards to tool data processor 136 below. The tool capture system data store 132 may store any other information associated with content creation applications.

The application data processor 134 may be configured to parse the obtained application data associated with the video to detect data identifiers (i.e., markers) for tools within the application used in the video. The application data processor 134 may receive the application data for a video (e.g., a livestream) from the capture device 110 via the network 120. In some examples, the application data processor 134 may receive the application data from the tool capture system data store 132. For live videos, the supplication data processor 134 may receive application data as a stream of data as more data is generated with time. The application data processor 134 may detect tool identifiers within the application data by comparing the data identifiers in the application data against the tool identifiers for the associated application stored in the tool capture system data store 132. The application data processor 134 may also extract the tool identifiers detected with their associated time markers indicating the times within the timeline of the video when each identifier was detected. The tool identifiers may be specific markers identified as belonging to content creation tools and/or their settings (e.g., size, brush stroke) of the application. In some examples, the tool identifiers may be specific markers associated with a specific interface or application used to generate the video in question. The tool identifiers and their corresponding time markers may then be communicated to the tool data processor 136. It should be understood that the tool data identifiers may be detected continuously in a stream as new application data is received for a live video.

The tool data processor 136 is generally configured to detect the tools being used within an application at any given time of the video timeline. In case of live videos, the tool data processor 136 is configured to detect the tools being used within a content creation application in real-time as the content is being created. The tool data processor 136 may obtain the tool identifiers detected in the video from the application data processor 134. The tool data processor 136 may access from the tool capture system data store 132, the tool capture system data including a list of all tool identifiers and their associated tool labels for all tools and their settings associated with the application from which the application data was captured. The tool identifiers and their associated tool labels may be stored in the tool capture system data store 132 in association with the specific application, interface, or platform used to generate the video. The tool data processor 136 may be configured to determine tool labels associated with the tool identifiers detected in the video by the application data processor 134. The tool data processor 136 may also associate the tool labels with their corresponding time markers. For live videos, the tool data processor 135 may associate new tool labels with their corresponding new time markers as the video continues to be generated and/or streamed.

The tool data processor 136 may be further configured to generate a tool record (see tool record 230 of FIG. 2) that includes the data labels associated with corresponding times for display on viewing device, such as the viewing device 140. The time markers associated with the tool identifiers in the application data may be leveraged to determine times within the timeline for tool labels. In live video examples, the tool record may be dynamically expanded as more tools are detected as the video is generated and/or streamed in real-time. In an implementation of the present technology, the tool data processor 136 may also associate the tool record with the video in question, such that when the video is accessed by a viewing device, via an application or a web browser, live or in replay, the tool record is presented in conjunction with the video.

Further, the tool data processor 136 is configured to associate the tool labels and their times with the timeline of the video. The tool data processor 136 may associate the timeline of the video with the tool labels, such that an interaction with a tool label in the tool record via the viewing device 140 may cause the video to jump to that time in the video timeline when the particular tool was detected as being used. The tool data processor 136 may configure the timeline of the video to be correlated with the times when tools were used based on the corresponding times associated with the tool labels in the tool record. In an implementation of the present technology, the tool data processor 136 may also associate the tool record with the video in question, such that when the video is accessed by the viewing device 140, via an application or a web browser, the tool record is presented in conjunction with the video (see for example, video presentation 200 of FIG. 2), and interaction with the tool record may directly be reflected in the video by jumping the video to associate time within the timeline for the tool label or time selected. In some examples, only the tool labels within the tool record are presented for viewing. In some other examples, both the tool labels and the corresponding times are presented for viewing. The tool labels may be dynamically expanded to present more tool labels as new tools and/or their settings are detected as being used in a live video.

Further, the tool data processor 136 may also be configured to provide markers in the video timeline for each time a tool is detected in the video. In this way, a viewer of the video can visually see where tools are being used in the creative process. The tool data processor 136 may provide the viewing device 140 with the tool record associated with the video when the viewing device 140 requests to view the video, via an application or a web browser, live or in replay. In some embodiments, the tool data processor 136 may communicated the tool record and the associated timeline to the tool capture system data store 132 for storing in association with the video. The tool capture system data store 132 may be accessed by the viewing device 140 via the network 120 when the viewing device 140 receives an indication of the video being requested for watching. The tool capture system data store 132 may provide the tool record to the viewing device 140 any time the associated video is watched via the viewing device 140, live or in replay.

In some implementations of the present technology, the tool data processor 136 may further be configured to generate a segmented transcript of the video. The tool data processor 136 may take as input an audio associated with the video. Any known method can be used to transcribe the audio. The transcript may be segmented into one or more sections. In one example, the transcript may be segmented based on the tool record, such that at each tool label and its corresponding time, the transcript is segmented into a new section. Further, each section of the transcript may be associated with the corresponding tool label. In another example, the transcript may be segmented based on tool names recognized in the transcript itself. In another example, pauses in the audio may further be used to segment the transcript, such that if a pause is longer than a threshold amount of time, the transcript is segmented at the pause. Any combination of the above may be used to segment the transcript. In some examples, one or more machine learning models may be trained and used to segment the transcript. The segments of the transcript and the associated segment times may be presented to viewing devices (e.g., viewing device 140) along with the video such that selection of either the segment or the segment time or the tool name in the segment may cause the video to jump to the segment time in the timeline.

In one embodiment of the present technology, a video segmenter 138 may be configured to leverage the transcript of the video and the tool record to determine a temporal segmentation of the video. The transcript may include explanation of major steps or techniques used by the creator of the video or livestream. In this regard, the video segmenter 138 may segment the transcript into individual sentences and each sentence may be associated with a start and end time of the corresponding sentence within the timeline of the video. The tools in the tool record may be categorized into various categories (e.g., navigational tools, editing tools, backtracking tools, etc.) based on each tool's functionality. For example, tools that do not alter the creative content (e.g., zoom, hide layer) in the video itself can be categorized as navigational tools, the tools that do alter the creative content (e.g., brush, create layer) can be categorized as editing tools, and tools that include undoing or deleting past actions, may be categorized as backtracking tools. In some examples, the tool record may further be categorized into various fine-grained categories (e.g., painting tools, typography tools, styling tools, etc.). The tool categories may be determined based on the underlying application on which the content is being created. The video segmenter 138 may identify all possible candidate boundaries (i.e., start times, end times) that indicate time segments for temporal segments within the timeline based on a union of all tools in the tool label and their associated times with the beginning and end time of each sentence of the segmented transcript. Any tool in the tool record with an associated time in the middle of a sentence beginning and end time may be disregarded for determining candidate boundaries for temporal segments. A candidate temporal segment, $p_i$, may be an interval between two consecutive candidate boundaries, $t_i$ and $t_{i+1}$, represented as $p_i=[t_i,t_{i+1})$. In some examples, a beginning part of the video is not considered for a candidate temporal segment, when the transcript does not include a tool name, and the tool record does not include a tool label for the beginning of the video.

In some examples, initially, the video segmenter 138 may determine introductory and conclusory temporal segments. The introductory temporal segment may be located in the beginning of the video before the creator begins generating the creative content and/or greets the viewers, introduces the content to be created, etc. The conclusory temporal segment may be located at the end of the video that includes the creator summarizing the video, advertising the creator's upcoming or past works, etc. In such examples, the video segmenter 138 may leverage the first tool and the last tool indicated in the tool record, categorized as editing tools, to determine the introductory and conclusory temporal segments. For example, the introductory temporal segment may be determined as a temporal segment starting at the start time of the video timeline and ending at the time associated with the first editing tool in the tool record. Similarly, the conclusory temporal segment may be determined as a temporal segment starting from the time associated with the last editing tool in the tool record and ending at the end time of the video timeline. In an example, if the time segment of an introductory or the conclusory temporal segment is less than 30 seconds in length, the time segment may be added to the first or last temporal segment, respectively, for the video.

The video segmenter 138 may be configured to determine an optimal set of boundaries for an optimal temporal segmentation of the video. A plurality of candidate temporal segments (i.e., candidate intervals) may be used to determine an optimal set of boundaries to segment the video into temporal segments (e.g., intervals). In some examples, for each interval, $p_i$, the video segmenter 138 may determine an optimal set of segments, $S_i$, based on all pervious intervals, including the interval in question. A total score, $E(S_i)$, for each possible temporal segmentation may be determined based on candidate boundaries and the corresponding candidate intervals. The intervals may be considered in order as they arrive in the video. In some examples, an optimal set of boundaries to segment the video for each interval, $p_i=[t_i, t_{i+1})$, may be determined by considering each previous candidate boundary, $t_j$, where j≤i. In some examples, the video segmenter 138 may determine whether a segment that includes intervals (e.g., candidate segments) $P_{ji}=\{p_j, \ldots, p_i\}$ should be included as a temporal segment or added to a previous (i.e., last) section in $S_{j-1}$. The two possibilities for each interval may be considered for all previous candidate boundaries, $t_j$. A score for each candidate segment may then be determined. In some examples, a total score for each candidate set of segments (e.g., candidate temporal segmentations) may be determined based on scores for individual segments in the set. A total score for a candidate set of segments, $S_i$, may be determined as follows:

$$E(S_i) = \frac{1}{|S_i|} \sum_{s \in S} e(s)$$

where $|S_i|$ is the number of segments in the candidate set of segments, $S_i$, and each s is a set of contiguous intervals $\{p_k, \ldots, p_{k+m}\}$. The candidate set of segments with the highest score may be determined to be the optimal temporal segmentation with the optimal temporal segments for the input video. In some examples, the candidate segment score, e (s), for each candidate segment, s, may be determined based on one or more of a duration of the segment, transitional tools in the tool record that fall within that segment, coherence of the application tools in the segment, and transitional phrases in the transcript belonging to that segment.

In some examples, the video segmenter 138 may be further configured to determine a score for each segment of a candidate set of segments (e.g., candidate temporal segmentation) based on a length of a duration of the corresponding segment. The video segmenter 138 may be configured to penalize extremely short (e.g., <1 minute) and/or extremely long (e.g., >10 minutes) segments. A linear drop off may be applied to a length scoring function from 1 to 0 for extremely short and/or extremely long segments. In some examples, candidate segments with a length of less than 30 seconds may be disregarded and the content of the segments may be added to a previous or a next segment. In some examples, a length score, $e_{length}(s)$, for a segment based on duration of the segment may be determined as follows:

$$e_{lenght}(s) = \begin{cases} -\infty & dur(s) \leq 0.5 \\ 2dur(s) - 0.5 & 0.5 < dur(s) < 1 \\ 11 - dur(s) & dur(s) > 10 \\ 1 & \text{otherwise} \end{cases}$$

where dur(s) is the duration of segment s in minutes.

Further, in some examples, the video segmenter 138 may also be configured to determine save and layer scores for candidate segments of the candidate temporal segmentations. Certain tools may indicate that a user is transitioning to a new task. For example, a save tool may indicate an end to a previous task, and a layer tool may indicate beginning of a new task. In some examples, a save tool followed by a longer gap in time before a new tool in the tool record may be scored higher than a save tool followed by a shorter gap. Similarly, a layer tool with a longer gap before a new layer tool may be score higher. Towards this end, a save score and a layer score may be determined for each candidate segment. In some examples, an importance save score, $I(c_{save}^i)$, may be calculated for each save tool, $c_{save}^i$, as follows:

$$I(c_{save}^i) = \frac{\text{gap}(c_{save}^i)}{\max_{c_{save} \in stream} \text{gap}(c_{save})}$$

where $\text{gap}(c_{save}^i)$ is the time gap between the current save tool and the next tool, the denominator is the maximum gap of all the save tools in the stream. The denominator is a normalization function. In order to prioritize the segments with a save tool near the end of the segment, the save score, $e_{save}(s)$, for a candidate segment is then computed as follows:

$$e_{save}(s) = \frac{t(c_{last\_save}(s)) - t_{start}(s)}{dur(s)} \times I(c_{last\_save}(s))$$

where $c_{last\_save}(s)$ is the last save tool in candidate segment s, $t(c_{last\_save}(s))$ is its timestamp in the timeline of the video, and $t_{start}(s)$ is the start time of the candidate segment s. Further, for a candidate segment including no save tools, the save score for that segment may be 0.

Similarly, in some examples, an importance score for a layer tool for each candidate segment may be determined. In order to prioritize longer time between consecutive layer tools for scoring, the importance score, $I(c_{layer}^i)$, may be determined as follows:

$$I(c_{layer}^i) = \frac{\text{gap}(c_{layer}^i)}{\max_{c_{layer} \in stream} \text{gap}(c_{layer})}$$

where $\text{gap}(c_{layer}^i)$ is the time gap between the current layer tool and the next layer tool, the denominator is the maximum gap of all the save tools in the stream. The denominator is a normalization function. Further, in an example, only layer tools with gap($c_{layer}^{i}$)≥30 seconds may be considered. In order to prioritize the segments with a layer tool near the beginning of the segment, the layer score, $e_{layer}(s)$, for a candidate segment is then computed as follows:

$$e_{layer}(s) = \frac{t_{end}(s) - t(c_{first\_layer}(s))}{dur(s)} \times I(c_{first\_layer}(s))$$

where $c_{first\_layer}(s)$ is the first layer tool in candidate segment s, $t(c_{first\_layer}(s))$ is its timestamp in the timeline of the video, and $t_{end}(s)$ is the end time of the candidate segment s. Further, for a candidate segment including no layer tools, the layer score for that segment may be 0.

The video segmenter 138 may also use coherence of tools used in the video to score candidate segments. Some tools may be used together to perform a single task. For example, color and brush tools may be used together. Such coherent tools may be used to segment the video into meaningful tasks. In some examples, a simple count of the number of times a pair of tools appear together in the tool record may be used to determine a level of coherence between a pair of tools. In this regard, the video segmenter 138 may determine a coherence, M, of a pair of tools, $c_a$ and $c_b$, as follows:

$$M(c_a, c_b) = \frac{\text{\# times } c_a \text{ occurs immediately before } c_b}{\text{total \# times } c_a \text{ occurs before any other tool}}$$

where the denominator normalizes the coherence to a range between 0 and 1, where coherence of a command with itself is the highest coherence (i.e., 1). The video segmenter 138 may determine a tool coherence score for each candidate segment based on the coherence between pairs of tools. In some examples, the coherence score, $e_{coherence}(s)$, for a candidate segment can be determined as follows:

$$e_{coherence}(s_i) = 1 - M(c_{last}(s_{i-1}), c_{first}(s_i))$$

where $c_{last}(s_{i-1})$ is the last tool in the previous segment, $s_{i-1}$, of the candidate set of segments, and $c_{first}(s_i)$ is the first tool in the candidate segment. As such, the coherence score for a segment is 1 if none of the last three intervals in the previous segment has tools and none of the first three segments in the current segment has tools. Similarly, the coherence score for a segment is 0 if one of the above two conditions hold. In this way, segment boundaries between two unrelated tools, and those between a period of no tool use and a period of tool use are prioritized such that the video is not segmented such that two adjacent segments divide up coherent tools.

The video segmenter 138 may be further configured to leverage semantics in video transcript to determine optimal temporal segmentation. Transcripts of the video often include transitional words and/or phrases (e.g., start, next, done, that's all) indicating start or end of a task. These key transitional words and/or phrases may be used to segment the video in a meaningful manner. For example, "start" or "next" may indicate beginning of a task, and "done" or "that's all" may indicate end of a task. Each segment of a candidate temporal segmentation may be associated with a start and an end score, based on occurrences of pre-determined transitional phrases in the corresponding segment. In examples, in order to prioritize segments with transitional words and/or phrases near the beginning and/or end of the segment, the start score, $e_{start}(s)$, and end score, $e_{end}(s)$, for a candidate segment may be defined as follows:

$$e_{start}(s) = \frac{t_{end}(s) - t_{start\_phrase}(s)}{dur(s)}$$

$$e_{end}(s) = \frac{t_{end\_phrase}(s) - t_{start}(s)}{dur(s)}$$

where $t_{start\_phrase}(s)$ is the time of the last start word or phrase in candidate segment, s, and $t_{end\_phrase}(s)$ is the time of the first end word or phrase in the candidate segment, s. The candidate segments without a start phrase or an end phrase may have the corresponding start or end score of 0.

While the examples here refer to segmenting a video based on a video transcript and tool record or information, it should be understood that other available information associated with the video may similarly be used by the video segmenter 138 to determine an optimal temporal segmentation for a video. For example, a user chat log or session corresponding to a live chat during the video may additionally be used to meaningfully segment a video into temporal segments.

Candidate segment scores for each candidate segment in each candidate temporal segmentation may be determined by the video segmenter 138. The candidate segment score, e(s), for each segment, s, may be determined based on one or more of a duration of the segment, transitional tools in the tool record that fall within that segment, coherence of the tools in the segment, and transitional phrases in the transcript belonging to that segment. In an example, the candidate segment score, e(s), for a candidate segment may be determined as follows:

$$e(s) = \alpha_{length} e_{length}(s) + \alpha_{save} e_{save}(s) + \alpha_{layer} e_{layer}(s) + \alpha_{coherence} e_{coherence}(s) + \alpha_{start} e_{start}(s) + \alpha_{end} e_{end}(s)$$

where $\alpha_{length}$, $\alpha_{save}$, $\alpha_{layer}$, $\alpha_{coherence}$, $\alpha_{start}$, and $\alpha_{end}$ are predetermined weights or constants for the corresponding scores. The weights may be determined based on the type of video or stream for which the temporal segmentation is desired. As described above, a total score for each candidate set of segments (e.g., candidate temporal segmentations) may be determined based on scores for individual segments in the set. A total score for a candidate set of segments, $S_i$, may be determined as follows:

$$E(S_i) = \frac{1}{|S_i|} \sum_{s \in S} e(s)$$

The candidate set of segments (e.g., candidate temporal segmentation) with the highest total score may be an optimal temporal segmentation for the video.

Further, the video segmenter 138 may segment the video based on the candidate temporal segments of the optimal temporal segmentation. The video segmenter 138 may use the optimal temporal segmentation to determine a temporal segmentation table including the optimal temporal segments (e.g., as sections) and their associated time segments based on the start and end time (e.g., optimal boundaries) of the segment within the timeline of the video. The temporal segments and corresponding time segments may be presented to viewing devices (e.g., viewing device 140) as a table along with the video such that selection of either the temporal segment or the time segment in the temporal segmentation table may cause the video to jump to the start time of the corresponding temporal segment in the timeline.

The tool capture and presentation system 100 may include a viewing device 140. The viewing device 140 is generally configured to view a video, live or in replay, via an application or a web browser, along with the tool record associated with the video. The viewing device 140 can access and communicate with the tool capturing system 130 via a web browser, other application or data capture engines, on the viewing device 140 via the network 120. Alternatively, in other embodiments, the tool capturing system 130 or portions thereof can be provided locally on the viewing device 140. The tool capturing system 130 or portions thereof can also be provided locally on the capture device 110. For example, the tool capturing system 130 or portions thereof may be built-into into the application 112B. In some examples, the tool capturing system 130, portions or functionality thereof may be provided by a live streaming programming interface that sends the video stream and the tool record to the viewing device 140 when the video is requested to be watched, live or on replay.

The viewing device 140 is generally configured to obtain a video, its associated tool record, and the optimal temporal segmentation (e.g., the temporal segmentation table) from the tool capturing system 130, and present the video via an application 142. The video may be any video including creation of content on a content creation application or webpage. The video may be watched live or in replay. The viewing device 140 may include an application 142 that can be used to present tool record and/or segmented transcript stored in association with the video in the tool capture system data store 132. The application 142 may be accessed, in some examples, using a web browser.

The application 142 of the viewing device 142 is configured to present a video to a user via a graphical user interface of the viewing device 142. The application 142 may be any application on the viewing device capable to presenting a video, including a web browser. The application 142 may be configured to receive a request to view the video. The application 142 may communicate with the tool capture system data store 132 to obtain the video for viewing or may receive live tool record directly from the tool data processor 136.

The application 142 is configured to provide the video for presentation along with the tool labels, the segmented transcript and/or the temporal segmentation table. When viewing a video live, the application 142 is configured to provide the video for presentation along with a dynamic tool record, segmented transcript, and/or a temporal segmentation table, the tool record, the segmented transcript, and the temporal segmentation table dynamically updating and expanding as tools are being used in the live video as it is being generated.

The application 142 may obtain the tool data structure, the segmented transcript, and/or the temporal segmentation table from the tool capture system data store 132. The application 142 may present the video with the tool labels, the segmented transcript, and/or the tool segmentation table in an interface of the application 142. The timeline of the video may be associated with the tool record and/or the temporal segmentation table such that an interaction (e.g., selection) with a tool label or a temporal segment presented by the application 142 may cause the video timeline to jump to the time associated with the selected tool label or temporal segment in the respective tool record or temporal segmentation table. In some examples, the application 122 may present the tool labels and/or the temporal segmentation table with time markers corresponding to each tool label and/or temporal segment, respectively, such that interaction with a time marker may jump the video to that time in the timeline of the video.

In some other examples, the application 122 may present the segmented transcript in conjunction with the video, such that an interaction with a tool name in the transcript or the segment time may cause the video timeline to jump to the start time of the segment. In another example, the application 142 may also present the timeline of the video with markers for the times associated with each tool in the tool record and/or times (e.g., start and end times) associated with each temporal segment associated with each temporal segment in the temporal segmentation table, such that an interaction with a marker may jump the video in the timeline to the selected marker. In this way, the viewing device 140 may allow a user to effectively and efficiently understand and navigate a content creation video. By exposing the tool and segmentation information to the user, the tool capturing and presentation system 100 may present a user with a user-friendly interface to navigate videos.

Figure 2:
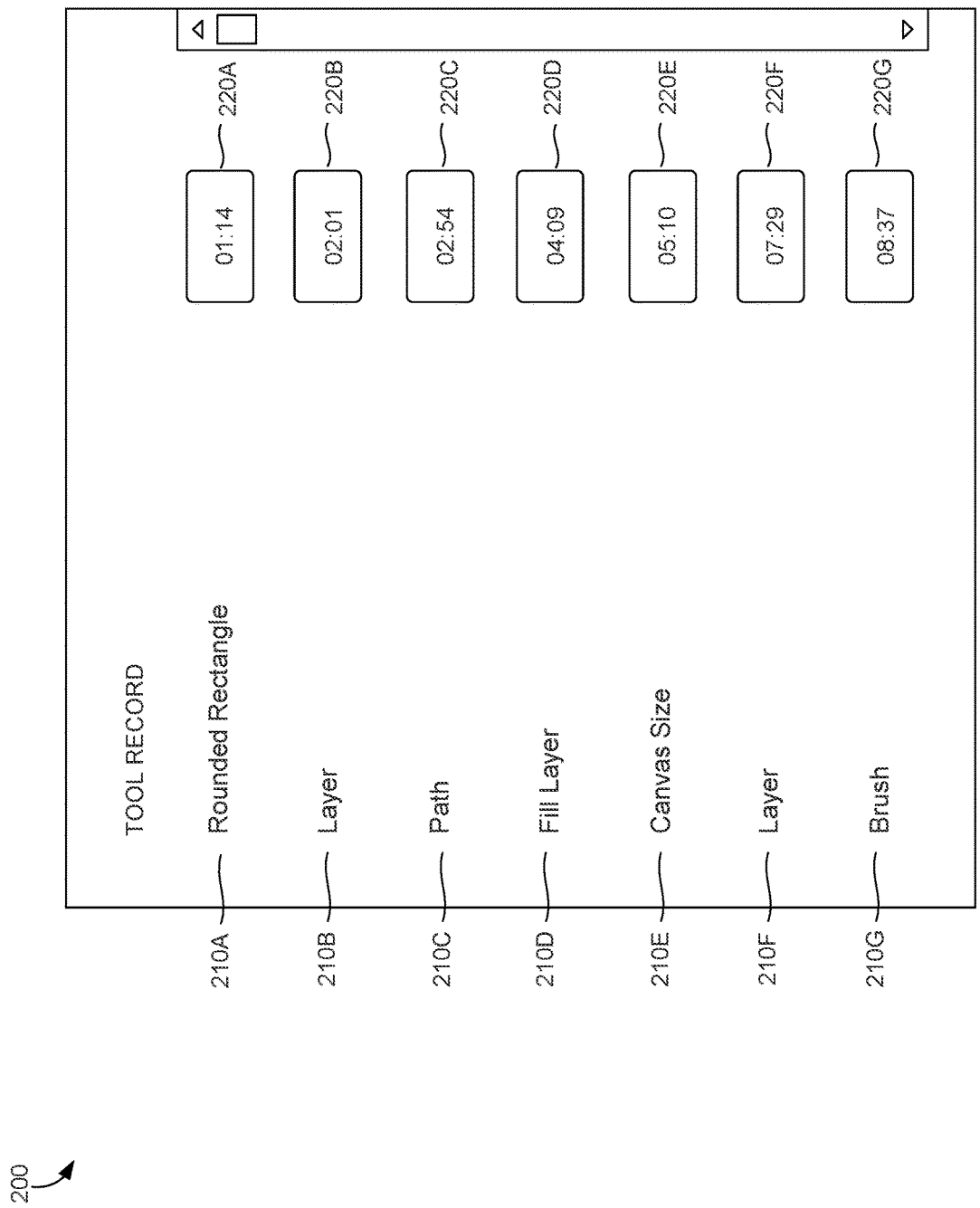
FIG. 2 is an illustration of an example user interface including a tool record showing tools used in a video, in accordance with embodiments of the present invention.

Now referring to FIG. 2, an illustration of a tool record 200 showing tools of a content creation application used in a video is provided, in accordance with embodiments of the present invention. The record 200 includes a table with tool labels, 210A-210G, and their corresponding times 220A-220G. The tool record 200 represents tools being used in a video at any given time. The tool record 200 may be generated by a tool data processor, such as tool data processor 136 by processing application data captured within an application used to create content in the video. It should be understood that while this example shows the tool record to include corresponding times, this is not necessary for some implementations of the system. For example, in some embodiments, only tool labels 210A-210G may be presented. The tool labels 210A-210G may be associated with the corresponding times, such that while not explicitly shown, selection of a tool label 210A, may cause the video to jump to time 1:14 in the video timeline.

Figure 3:
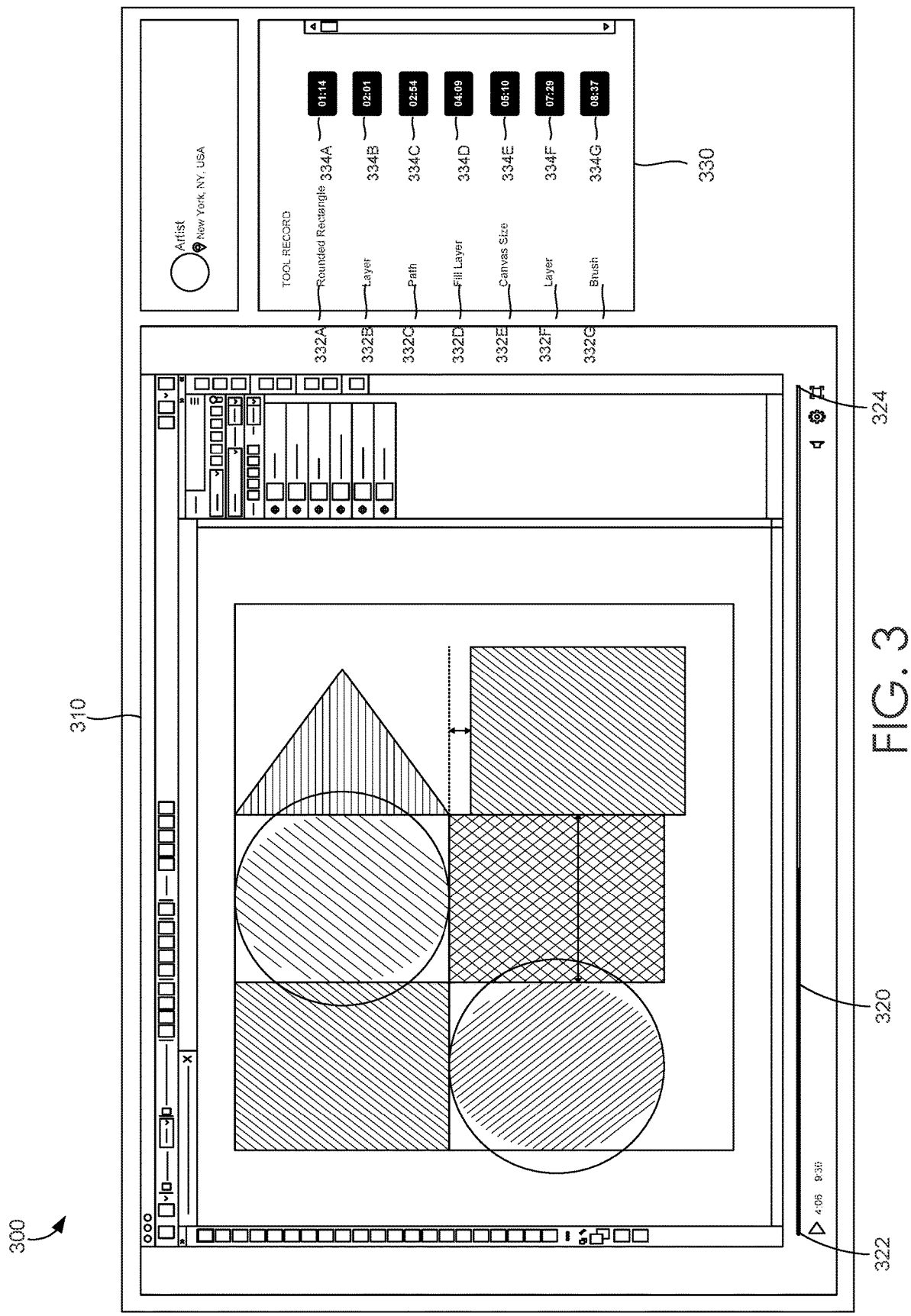
FIG. 3 is an illustration of a user interface including a video presentation and a tool record showing tools used in the video, in accordance with embodiments of the present invention.

FIG. 3 provides an illustration of a user interface 300 including a video presentation and a tool record showing tools used in the video, in accordance with embodiments of the present invention. The video 310 with a timeline 320 is presented in conjunction with a tool record 330. The timeline 320 may include a start time 322 and an end time 324 (or current time in the case of a livestream). The tool record 330 exposes tool labels 332A-332G with their corresponding times 334A-334G. In live video, the tool record 330 is expanded as new tools are being used and are captured. The times 334A-334G represent the time within the timeline 320 of the video 310 where the respective tools 332A-332G are determined to have been used. In some examples, the tool labels 332A-332G and their corresponding times 334A-334G may be associated with the timeline 320 such that a selection of a tool label or a time in the tool record 330 may jump the video 310 to the time in the timeline 320. For example, selection of tool label 332A may jump the video 310 to time 01:14 in the timeline 320. In some embodiments, only the tool labels 332A-332G may be presented.

Figure 4:
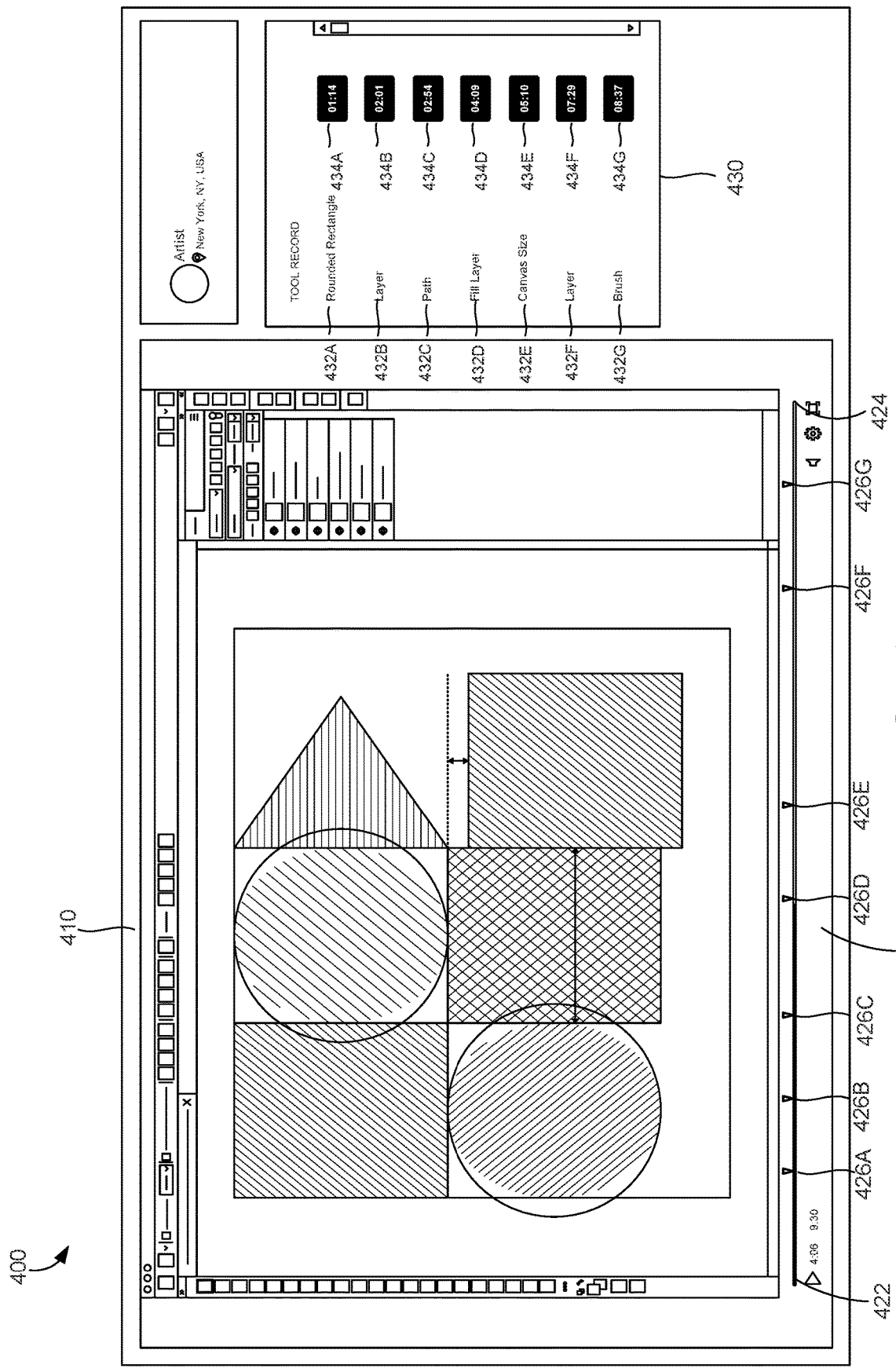
FIG. 4 is an illustration of an example user interface with a video timeline highlighting times when content creation tools are used in a video, in accordance with embodiments of the present invention.

FIG. 4 provides an illustration of an example user interface 400 with a video timeline highlighting times when content creation tools are used in a video, in accordance with embodiments of the present invention. The video timeline 420 of video 410 may include markers 426A-426G representing times at which each tool in the tool record 430 is used. For example, marker 426A may represent time 434A in the tool record 430, where the marker 426A represents use of tool label 432A in the video 410. In some examples selecting a marker of markers 426A-426G may jump the video to begin playing from the corresponding time in the timeline 420A, where the timeline 420A includes a start time 422A and an end time 422B representing the start and end of the video 410.

Figure 5A:
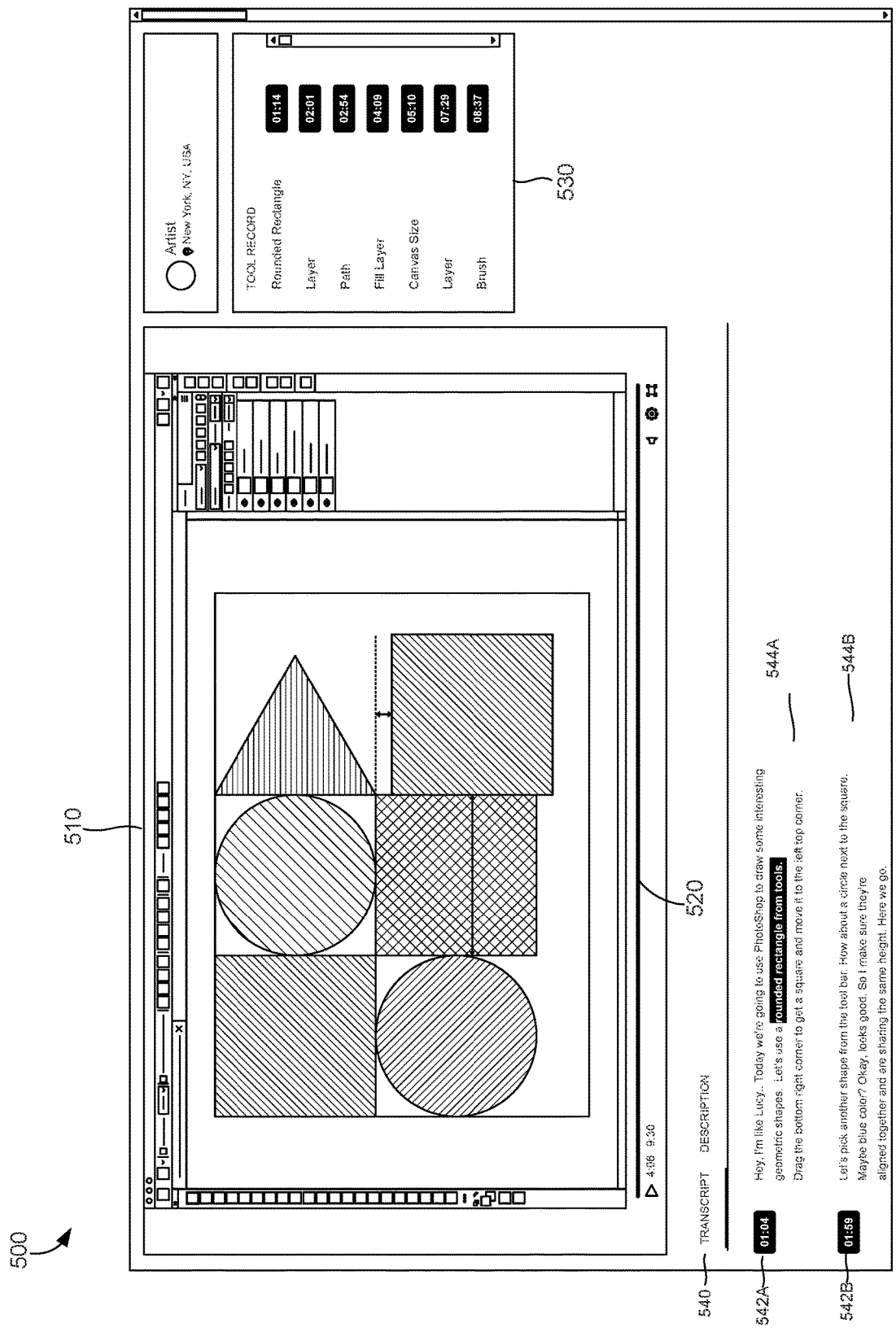
FIG. 5A is an illustration of an example user interface with segmented transcript of a video, in accordance with embodiments of the present invention.

FIG. 5A provides an illustration of an example user interface 500 with segmented transcript of a video, in accordance with embodiments of the present invention. The segmented transcript 540 may include segments 544A-544B of a transcript of video 510 along with start times 542A-542B representing the start times of the segments in the timeline 520 of video 510. The start times 542A-542B may be associated with the timeline 520 such that a selection of a start time may jump the video 510 to the associated time in the timeline 520. For example, selection of start time 542A may jump the video 510 to time 01:04 in the timeline 520. Further, in some examples, selection of a tool name or a phrase including the tool name 444 may jump the video to time 01:04 in the timeline 520.

Figure 5B:
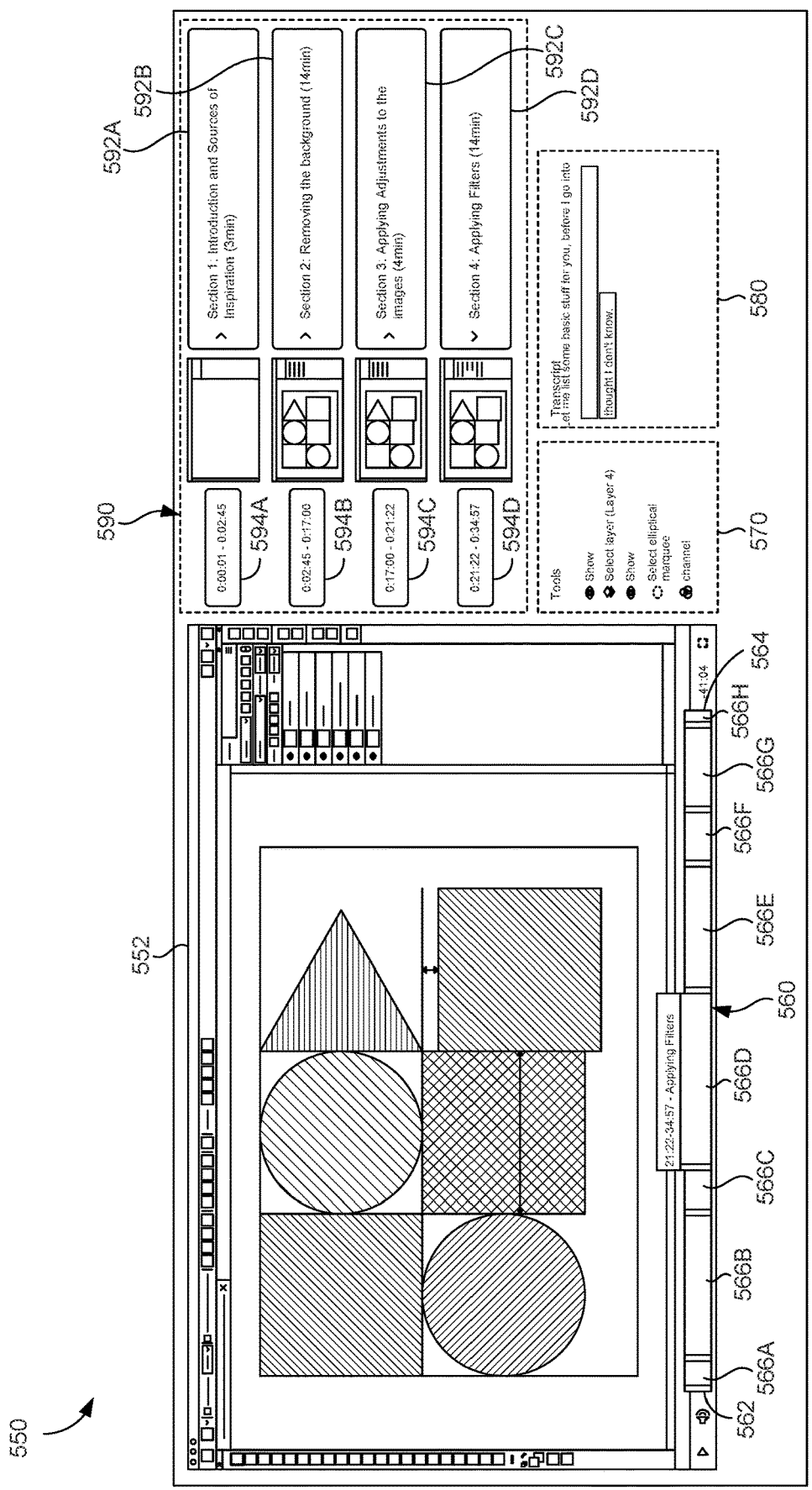
FIG. 5B is an illustration of an example user interface with a temporal segmentation of a video, in accordance with embodiments of the present invention.

FIG. 5B provides an illustration of an example user interface 550 with a temporal segmentation of a video 552, in accordance with embodiments of the present invention. The temporal segmentation 590 may include segments 592A-592D of video 552 along with corresponding time segments 594A-594D representing start and end times of the temporal segments. The timeline 560 of the video 500 may also be segmented into sections 556A-556H based on the time segments 594A-594D. The temporal segments may be represented in the timeline 560 using makers within the timeline. The temporal segments may be represented as a section between two markers. The temporal segments 592A-592D and/or the time segments 594A-594D may be associated with the timeline 560 such that a selection of segment (e.g., 592A-592D) or a time segment (e.g., 594A-594D) may jump the video 510 to the associated start time of the corresponding time segment (e.g., 594A-594D) in the timeline 520. For example, selection of segment 592B may jump the video 552 to time 0:02:45 in the timeline 560. Further, in some examples, selection of the time segment 594D 444 may jump the video to time 0:02:45 in the timeline 520. The tool table 570, transcript 580 and/or a chat, alone or in combination, may be used to determine the temporal segments of the video 560.

Figure 6:
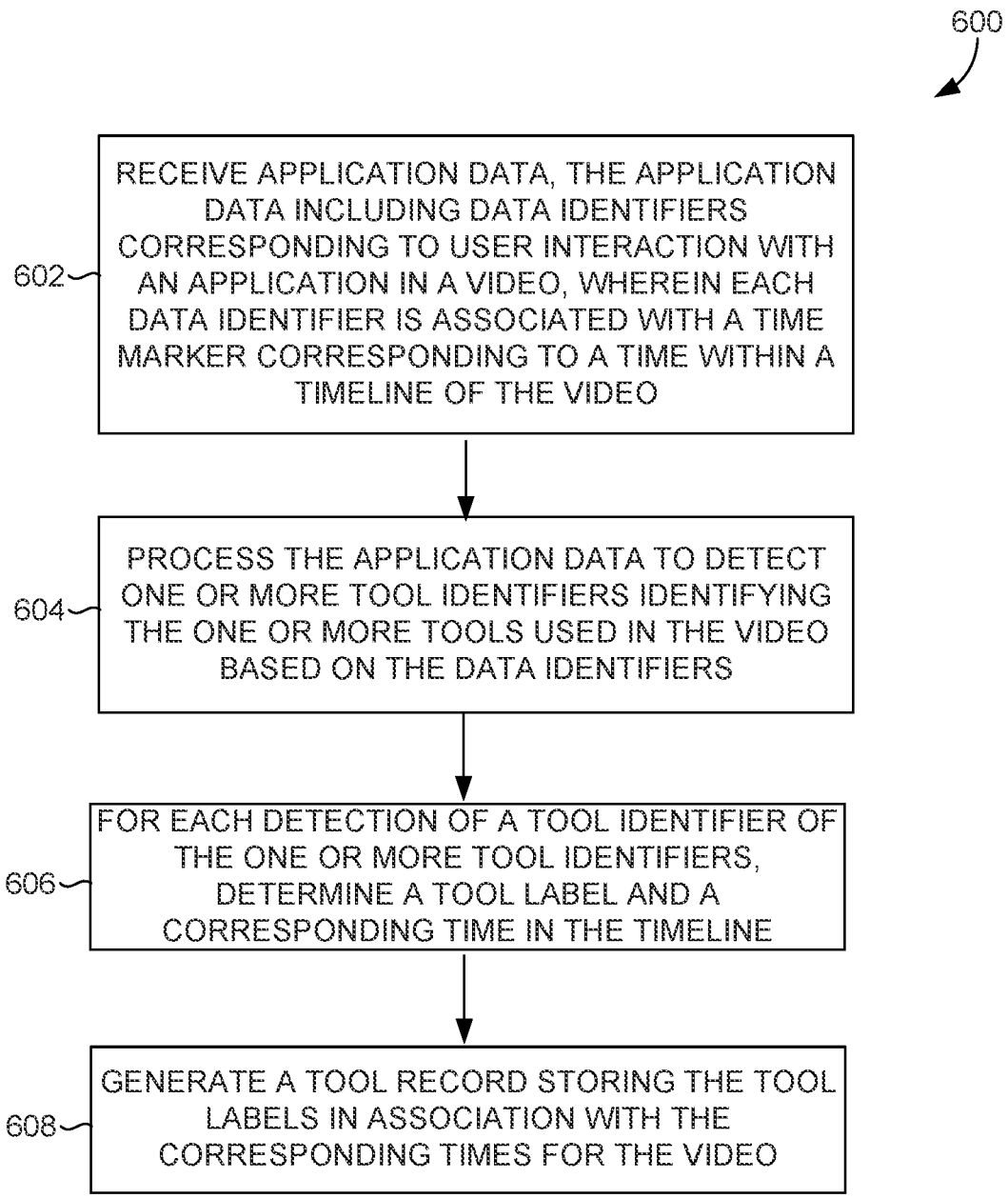
FIG. 6 is a flow diagram showing a method for capturing content creation tools used in a video, in accordance with embodiments of the present invention.

Referring now to FIG. 6, a flow diagram showing a method 600 for content creation tools used in a video in a video. Each block of the method 600 and any other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 600 may be performed, for instance, by capture device 110, the tool capturing system 130 and the viewing device 140 of FIG. 1.

FIG. 6 is a flow diagram showing a method 600 for capturing content creation tools used in a video, in accordance with some embodiments of the present disclosure. Initially, as shown at block 602, application data is received. The method 600 may be performed while a video is being generated or streamed in real-time or after the entirety of the video has been generated. For a video being watched live, as the video is being generated or streamed, the application data is received in a continuous stream as the data is being captured live. However, for a video that has already been generated in its entirety, the application data may be received for the entire video together in one batch. The application data includes data identifiers corresponding to user interactions with an application for the duration of a video. Each data identifier is associated with a time marker corresponding to a time within a timeline of the video. In some embodiments, application data may be captured using a data capture engine of a capture device, as show above.

The application data is then processed, as shown at block 604. One or more tool identifiers may be detected. The tool identifiers identify tools and/or their corresponding settings used in the video based on the data identifiers. The tool identifiers in the application data may be determined based on comparing the data identifiers with a list of plurality of data identifiers corresponding to tools available in an application. The data identifiers in a video being generated or streamed in real-time are added to the application data as they are received. The data identifiers may be compared with the list of plurality of data identifiers in real-time. In some examples, the data identifiers may be compared with the list of plurality of data identifiers corresponding to tools for a previously generated video in a batch. The list of the data identifiers corresponding to the tools of an application may be stored in a data store.

As shown at block 606, a tool label (e.g., a tool name, tool setting) and a corresponding time in the timeline of the video is determined for each detected tool identifier. The tool labels are stored in the data store in a tool label to tool identifier mapping for an application. The tool labels for each tool identifier may be determined and associated with the time in the timeline associated with that tool identifier. For a video being generated in real-time, more tool labels and their corresponding times may be added in real-time as the tools are being used.

A tool record storing the tool labels in association with corresponding times for the video is generated at block 608. The tool record may be a table with tool labels. In some examples, the tool record may be a table with tool labels and their corresponding times. The tool record may be expanded with new tool labels as new tools are used and captured in a video as it is being generated in real-time. In some cases, the tool record may be associated with the timeline of the video such that the time and the tool labels may be correlated to the times in the timeline and a selection by a user of a tool label (or a time, if presented in tool record) jumps the video to that time in the timeline of the window that the selected label was detected.

Figure 7:
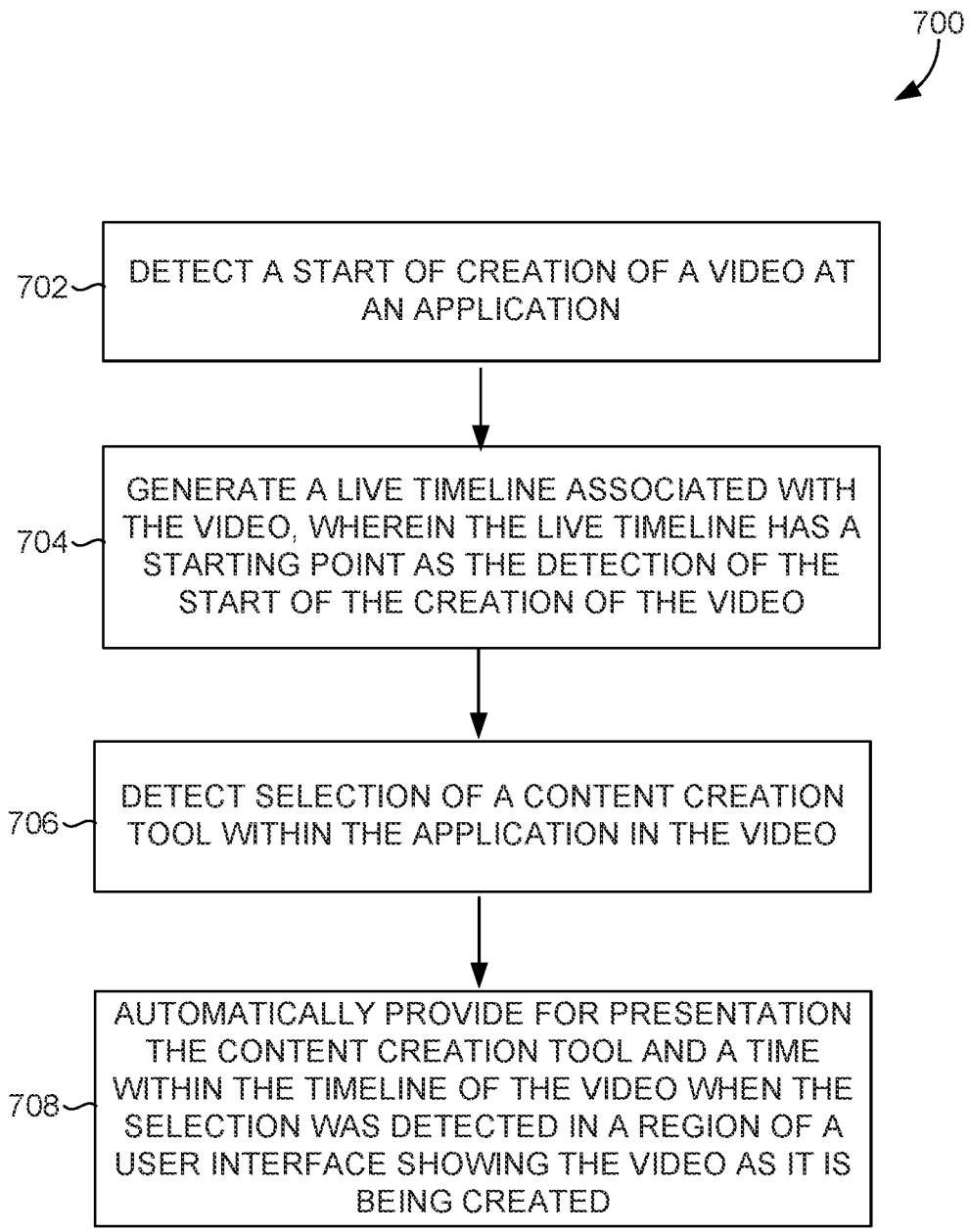
FIG. 7 is a flow diagram showing a method for presenting content creation tools used in a video, in accordance with embodiments of the present invention.

FIG. 7 provides a flow diagram showing a method 700 for presenting content creation tools used in a video, in accordance with embodiments of the present invention. Initially, as show at block 702, a start of creation of a video at an application is detected. A data capture engine of a capture device may begin capturing the application data when a start of a creation of a video using the application is detected.

A live timeline associated with the video is then generated at block 704. The live timeline has a starting point as the detection of the start of the creation of the video. The timeline may iteratively be adjusted as the video continues to be recorded. In some cases, a data capture engine may begin capturing application data, including data identifiers, representing interaction of the video creator with the application.

At block 706, selection of a content creation tool and/or its setting within the application in the video is detected. The content creation tool may be any tool in the application that is used while creating the video. In some cases, selection of the content creation tool and/or its setting may be detected based on a data identifier in the application data matching a tool identifier in a data store storing the mapping of tool identifiers and content creation tools of the application.

The content creation tool and/or its setting is caused to be presented at block 708. The content creation tool and/or its setting is presented in a region of a user interface showing the video as it is being created. The content creation tool and/or its setting may be selectable by the user in order to navigate to a corresponding time when the content creation tool and/or its setting was detected in the video, allowing a user to efficiently and easily navigate the video.

Figure 8:
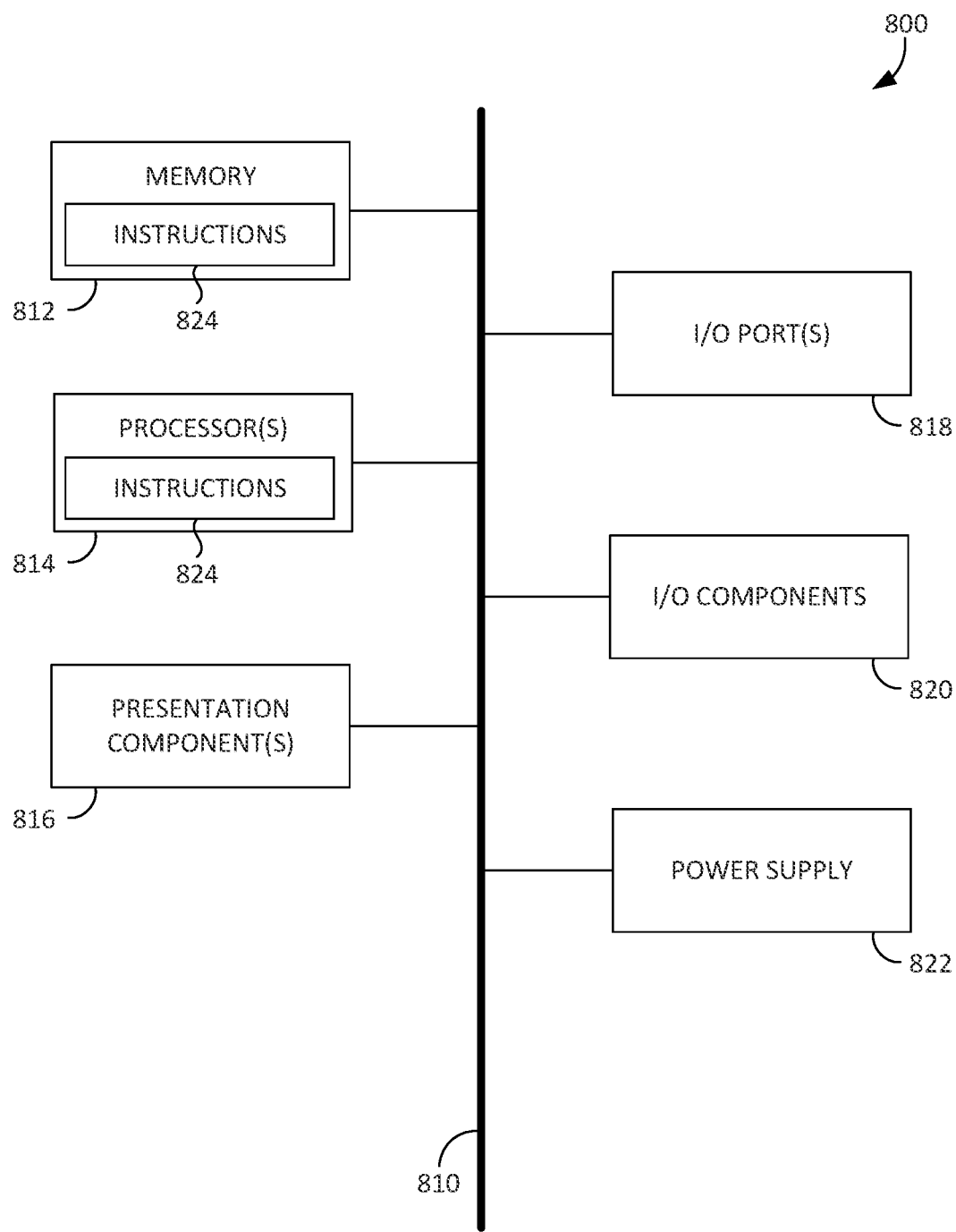
FIG. 8 is a block diagram of an example computing device suitable for use in implementing some embodiments of the present disclosure.

Having described implementations of the present disclosure, an exemplary operating environment in which embodiments of the present invention may be implemented is described below in order to provide a general context for various aspects of the present disclosure. Referring to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

The subject matter of the present invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present and/or future technologies. More-over, although the terms "step" and/or "block" may be used herein to connote different elements of methods employed, the terms should not be interpreted as implying any particular order among or between various steps herein disclosed unless and except when the order of individual steps is explicitly described.

As described above, implementations of the present disclosure generally relate to capturing and presenting tools used in a video. Embodiments of the present invention have been described in relation to particular aspects, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objectives set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer useable instructions that, when used by one or more computing devices, cause the one or more computing devices to perform operations comprising:
    receiving application data associated with a video, the video showing a content creation application with content being generated in the content creation application, the application data including data identifiers corresponding to user interaction with the content creation application to generate the content, wherein each data identifier is associated with a time marker corresponding to a time within a timeline of the video;
    processing the application data to detect, based on the data identifiers, tool identifiers identifying different content creation tools of the content creation application used to generate or modify the content in the content creation application;
    for each detection of a tool identifier, determining a tool label identifying a corresponding content creation tool of the content creation application and a corresponding time in the timeline; and
    generating a tool data record storing the tool labels in association with corresponding times for the video.

2. The media of claim 1, wherein the operations are performed in real-time as the video is generated of the user interaction with the content creation application.

3. The media of claim 1, the operations further comprising:
    receiving a selection of the video for watching via an interactive user interface;
    causing, via the interactive user interface, presentation of the tool record in conjunction with the video, such that the tool record includes for each tool identifier, a selectable indication of a corresponding tool label.

4. The media of claim 3, the operations further comprising:
    receiving a selection of a tool label of the tool labels via the interactive user interface; and
    causing the video to jump to the time in the timeline associated with the selected tool label.

5. The media of claim 1, wherein receiving the application data comprises capturing the application data using an accessibility application programming interface of the content creation application.

6. The media of claim 1, wherein the application data is captured via an add-on associated with the content creation application.

7. The media of claim 1, wherein the tool identifiers are detected based at least in part on accessing a database including data identifiers corresponding to a plurality of content creation tools of the content creation application.

8. The media of claim 1, wherein at least one of the content creation tools includes an element of the content creation application corresponding to one of color, text, size, stroke, shape, fill, path or a setting thereof.

9. The media of claim 1, the operations further comprising:
    generating a transcript of the video, the transcript including times corresponding to the timeline and associated with each of a sentence in the transcript; and
    determining one or more candidate temporal segmentations of the video based at least in part on the transcript and the tool record, each one of the one or more candidate temporal segmentations including a candidate set of segments of the video such that the candidate set of segments together form the video, each segment of the candidate set of segments including a start time and an end time corresponding to the timeline based at least in part on the times associated with the sentences in the transcript;
    for each of the one or more of the candidate temporal segmentations of the video, determining a candidate segment score for each candidate segment of the corresponding candidate set of segments;
    for each of the one or more of the candidate temporal segmentations of the video, determining a total score based on the corresponding candidate segment scores; and
    generating a temporal segmentation table storing a set of segments of a candidate temporal segmentation with the highest total score, the temporal segmentation table including corresponding start and end times of each segment of the corresponding candidate set of segments.

10. A tool presentation system comprising:
    one or more hardware processors and memory configured to provide computer program instructions to the one or more hardware processors;
    a data capture engine configured to use the one or more hardware processors to:
        detect a start of creation of a video capturing content being generated in a content creation application; and
        generate a live timeline associated with the video, wherein the live timeline has a starting point as the detection of the start of the creation of the video;
    a data capture and presentation environment configured to use the one or more hardware processors to:
        detect each selection of a content creation tool, from a plurality of content creation tools of the content generation application, to generate or modify content within the content creation application while the video is being created; and
        automatically provide for presentation, for each content creation tool selected, information identifying the content creation tool and a time within the timeline of the video when the selection was detected in a region of a user interface showing the video.

11. The tool presentation system of claim 10, wherein the selection of each content creation tool is detected based on a tool identifier identified in one or more data identifiers included in application data captured from the content creation application.

12. The tool presentation system of claim 11, wherein the tool identifier is identified based at least in part on a list of tool identifiers associated with the content creation application, the list of tool identifiers including a tool identifier for each content creation tool from the plurality of content creation tools available for use in the content creation application.

13. The tool presentation system of claim 10, wherein the data capture and presentation environment is further configured to use the one or more hardware processors to:
receive an indication of selection of the information identifying a first content creation tool; and
cause the video to jump to the time corresponding to the first content creation tool in the timeline of the video.

14. The tool presentation system of claim 10, wherein the data capture and presentation environment is further configured to use the one or more hardware processors to:
receive an indication of selection of the time associated with a first content creation tool; and
cause the video to jump to the time corresponding to the first content creation tool in the timeline of the video.

15. The tool presentation system of claim 10, wherein the data capture and presentation environment is further configured to use the one or more hardware processors to:
segment a transcript of the video based on the time a first content creation tool was detected in the video; and
provide for presentation the segmented transcript.

16. A computer-implemented method comprising:
receiving application data associated with a video, the video showing a content creation application with content being generated in the content creation application, the application data including data identifiers corresponding to user interaction with the content creation application to generate the content wherein each data identifier is associated with a time marker corresponding to a time within a timeline of the video;
processing the application data to detect, based on the data identifiers, a plurality of different content creation tools used to generate or modify the content in the content creation application;
for each content creation tool of the plurality of different content creation tools, determining a corresponding time in the timeline; and
causing presentation of a tool record identifying at least a portion of the plurality of different content creation tools in association with presentation of the video.

17. The method of claim 16, wherein processing the application data to detect the plurality of different content creation tools based on the data identifiers includes identifying tool identifiers in the data identifiers, the tool identifiers corresponding to the plurality of content creation tools.

18. The method of claim 17, wherein the tool identifiers are identified by comparing the data identifiers with a list of a plurality of tool identifiers, the plurality of tool identifiers including identifiers for a plurality of content creation tools of the content creation application.

19. The method of claim 16, wherein the method further comprises:
receiving a selection of a first content creation tool in the tool record; and
responsive to the selection of the first content creation tool, causing the video to jump to a time corresponding to the selected first content creation tool in the timeline of the video.

20. The method of claim 16, wherein the tool record includes, for each content creation tool presented in the tool record, the corresponding time for the content creation tool.

* * * * *